United States Patent [19]

Barbee

[11] Patent Number: 4,841,012
[45] Date of Patent: Jun. 20, 1989

[54] POLYESTERS WITH IMPROVED GAS BARRIER PROPERTIES

[75] Inventor: Robert B. Barbee, Kingsport, Tenn.

[73] Assignee: Eastman Kodak Company, Rochester, N.Y.

[21] Appl. No.: 236,382

[22] Filed: Aug. 25, 1988

[51] Int. Cl.$^4$ .............................................. C08G 63/66
[52] U.S. Cl. .................................. 528/125; 528/209; 525/437
[58] Field of Search ................. 528/125, 209; 525/437

[56] References Cited

U.S. PATENT DOCUMENTS

| | | | |
|---|---|---|---|
| 4,110,315 | 8/1978 | Go | 528/294 |
| 4,307,060 | 12/1981 | Go | 264/540 |
| 4,426,512 | 1/1984 | Barbee et al. | 528/173 |
| 4,440,922 | 4/1984 | Barbee et al. | 528/194 |
| 4,482,695 | 11/1984 | Barbee et al. | 528/208 |
| 4,501,879 | 2/1985 | Barbee et al. | 528/288 |
| 4,510,295 | 4/1985 | Bezwada et al. | 528/437 |
| 4,546,170 | 10/1985 | Barbee et al. | 528/302 |
| 4,552,948 | 11/1985 | Barbee et al. | 528/194 |
| 4,560,741 | 12/1985 | Davis et al. | 528/302 |
| 4,574,148 | 3/1986 | Wicker, Jr. et al. | 528/173 |
| 4,663,426 | 5/1987 | Wicker, Jr. et al. | 528/190 |

Primary Examiner—Harold D. Anderson
Assistant Examiner—T. Mason
Attorney, Agent, or Firm—Charles R. Martin; William P. Heath, Jr.

[57] ABSTRACT

Polyester resins useful for forming containers having improved resistance to gas permeability comprising the reaction product of (A) a dicarboxylic acid corresponding to the structure

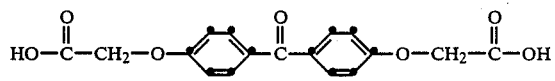

and (B) a diol selected from the group consisting of ethylene glycol, 1,4-butane diol and 1,4-cyclohexanedimethanol.

4 Claims, No Drawings

POLYESTERS WITH IMPROVED GAS BARRIER PROPERTIES

The invention relates to polyester resins useful for forming packages which have improved gas barrier properties.

Presently there is a strong interest in the packaging industry for protecting consumable products such as foodstuffs, medicines, and especially carbonated beverages by enveloping the substances in packages which are formed from various polymers. While molded containers formed from known polyesters have many desirable characteristics, there is a need in the art to provide improved polyester containers which will have lower gas permeabilities. Such improved containers would be much more versatile in their utilization and allow the containers to be used to package substances for which containers of known polyesters may not be suitable.

In accordance with the present invention, it has been found that a particular polyester exhibits enhanced gas barrier properties. The polyester can be described as comprising the reaction product of (A) a dicarboxylic acid corresponding to the structure

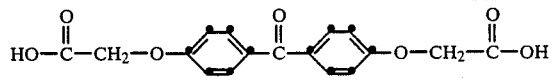

and (B) a diol selected from the group consisting of ethylene glycol, 1,4-butane diol and 1,4-cyclohexanedimethanol.

Most preferably, the diol component comprises ethylene glycol. Additionally, minor amounts (i.e., less than about 50 mole percent, and, preferably, less than about 10 mole percent, based on the total amount of diol present in the polyester) of other known polyester-forming glycols may also be employed. Such diols may include, for example, 2,4-dimethyl-2-ethylhexane-1,3-diol; 2-ethyl-2-butyl-1,3-propanediol; 2-ethyl-2-isobutyl-1,3-propanediol; 2,2,4-trimethyl-1,6-hexanediol; 4,4'-sulfonyldiphenol; 4,4'-oxydiphenol; 4,4'-isopropylidenediphenol; 2,5-naphthalenediol; and other well known polyester-forming diols.

The polyesters of the present invention exhibit an I.V. of at least 0.5, preferably at least 1.0 measured at 25° C. in a 60/40 by weight mixture of phenol/tetrachloroethane at a concentration of 0.5 g/100 mL.

The polyesters of the present invention are prepared by methods well-known in the art. The reactants may all be reacted in a single operation or, alternatively, sequential operation may be employed. Temperatures which are suitable for forming the polyesters generally range between about 180° C. and about 295° C., with the preferred range being about 200° C. to 285° C. The reaction may be conducted under an inert atmosphere, such as nitrogen. Preferably, the latter stage of the reaction is conducted under a vacuum. Conventional catalysts are typically used.

Optionable additives, such as dyes, pigments, plasticizers, fillers, antioxidants, and stabilizers may be employed in conventional amounts. Such additives may be added directly to the reaction or may be added to the final polymer.

The polyester are formed into containers using conventional plastic processing techniques such as compression molding and blow molding. Preferably, the molded containers are biaxially oriented blow-molded containers. Strong, flexible and clear sheets, films and other like structures can be formed by well known extrusion techniques. These may be formed into wrappers, bags and the like.

The polyesters may also be used to form a laminating layer between two or more permeable layers of film. In like manner, a layer of the polyester of the present invention may be coextruded as a pipe or similar structure between two or more compatible, permeable layers. The polyesters may also be used for dip coating containers from a polymer solution in order to improve the barrier properties of a package. In each of these embodiments, the present invention offers the additional advantage of not requiring the use of a tie layer.

Containers made from the polyesters are ideally suited for protecting consumable products, such as foodstuffs, soft drinks, and medicines. These containers have desirable low oxygin and carbon dioxide permeability. Because of the decreased gas transmission rates of these polyesters, they perform well in packaging applications where improved gas barrier properties are required. Typically, the containers of the present invention exhibit an oxygen permeability of less than about 3.0, preferably, less than about 2.5, and a carbon dioxide permeability of less than about 15, preferably, less than about 13, measured as cubic centimeters permeating a 1 mil thick sample, 100 inches square, for a 24-hour period under a partial pressure difference of 1 atmosphere at 30° C.

EXAMPLE

A reaction vessel was charged with 19.00 g (0.076 mol) of (carbonyl bis(4,1-phenylene) bis(oxy)) bis(acetic acid), 14.26 g (0.23 mol) of ethylene glycol, and 100 ppm of titanium from titanium tetraisopropoxide. The reaction mixture was heated and stirred under nitrogen at 190° C. for 60 minutes. The temperature was then increased to 210° C. for 60 minutes until all of the water had distilled out of the reaction mixture. The temperature was then raised to 250° C. and a vaccuum was applied. The melt condensation was continued at 250° C. for 30 minutes under 0.1 mm Hg pressure. The heating was discontinued, the reaction was brought to atmospheric pressure with nitrogen, and the polymer was collected. The polymer exhibited an I.V. of 0.95. The product was ground to pass a three millimeter screen, dried, and pressed into a film. The oxygen permeability of the polyester is measured to be about 0.85 cc. mil/100 in.$^2$ 24 hr. atm as determined in cubic centimeters permeating a 1 mil thick sample, 10 inches square, for a 24-hour period under an oxygen partial pressure difference of one atmosphere at 30° C. using a MOCON Oxtran 100 instrument. The polyester is extruded into amorphous film using a Brabender extruder at 250°–290° C. The film used to measure permeability is converted to a one-mil basis using conventional calculations.

I claim:

1. A polyester having an inherent viscosity of at least 0.5 measured at 25° C. in a 60/40 by weight mixture of phenol/tetrachloroethane at a concentration of 0.5 g/100 mL comprising the polyester reaction product of:

(A) a dicarboxylic acid corresponding to the structure

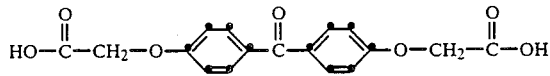
and
(B) a diol selected from the group consisting of ethylene glycol, 1,4-butane diol and 1,4-cyclohexanedimethanol.
2. The polyester of claim 1 wherein the diol is ethylene glycol.
3. A container formed from the polyester of claim 1.
4. A film formed from the polyester of claim 1.
* * * * *